US009891625B1

(12) United States Patent
Kahn

(10) Patent No.: US 9,891,625 B1
(45) Date of Patent: Feb. 13, 2018

(54) VEHICLE WITH AUTONOMOUS FEATURE OVERRIDE FOR THEFT PREVENTION

(71) Applicant: Michael Robert Kahn, Cherry Hill, NJ (US)

(72) Inventor: Michael Robert Kahn, Cherry Hill, NJ (US)

(73) Assignee: VERIPAT, LLC, Mount Holly, NJ (US)

( * ) Notice: Subject to any disclaimer, the term of this patent is extended or adjusted under 35 U.S.C. 154(b) by 0 days.

(21) Appl. No.: 15/356,635

(22) Filed: Nov. 20, 2016

(51) Int. Cl.
G05D 1/02 (2006.01)
B60K 28/00 (2006.01)
G08G 1/16 (2006.01)
G07C 5/00 (2006.01)
B60K 28/14 (2006.01)

(52) U.S. Cl.
CPC ........... *G05D 1/0214* (2013.01); *B60K 28/14* (2013.01); *G07C 5/008* (2013.01); *G08G 1/16* (2013.01); *G05D 2201/0213* (2013.01)

(58) Field of Classification Search
CPC ......... G05D 1/0214; G05D 2201/0213; B60K 28/14; G08G 1/16; G07C 5/008
See application file for complete search history.

(56) References Cited

U.S. PATENT DOCUMENTS

| 7,761,544 B2* | 7/2010 | Manasseh | G07C 5/008 709/223 |
| 8,996,224 B1 | 3/2015 | Herbach et al. | |
| 9,475,496 B2 | 10/2016 | Attard et al. | |
| 9,809,196 B1* | 11/2017 | Penilla | B60R 25/10 |
| 2009/0157255 A1* | 6/2009 | Plante | G06Q 10/00 701/33.4 |
| 2012/0281878 A1* | 11/2012 | Matsuda | G06T 7/0046 382/103 |
| 2015/0346337 A1 | 12/2015 | Jung | |
| 2016/0252903 A1 | 9/2016 | Prokhorov | |

* cited by examiner

Primary Examiner — Michael J Zanelli

(57) ABSTRACT

Embodiments of the present invention provide an autonomous vehicle with an emergency escape mode. When fleeing a scene is critical, embodiments provide an AV that can operate in an emergency escape mode (EEM) to enable the AV to flee a scene, protecting its occupants. Typically, a passenger or operator invokes EEM in an AV when they are in imminent danger from criminal activity such as carjacking. A least resistance route can be computed to determine an escape route that provides for reduced chance of injury and/or increased probability of a successful escape.

18 Claims, 8 Drawing Sheets

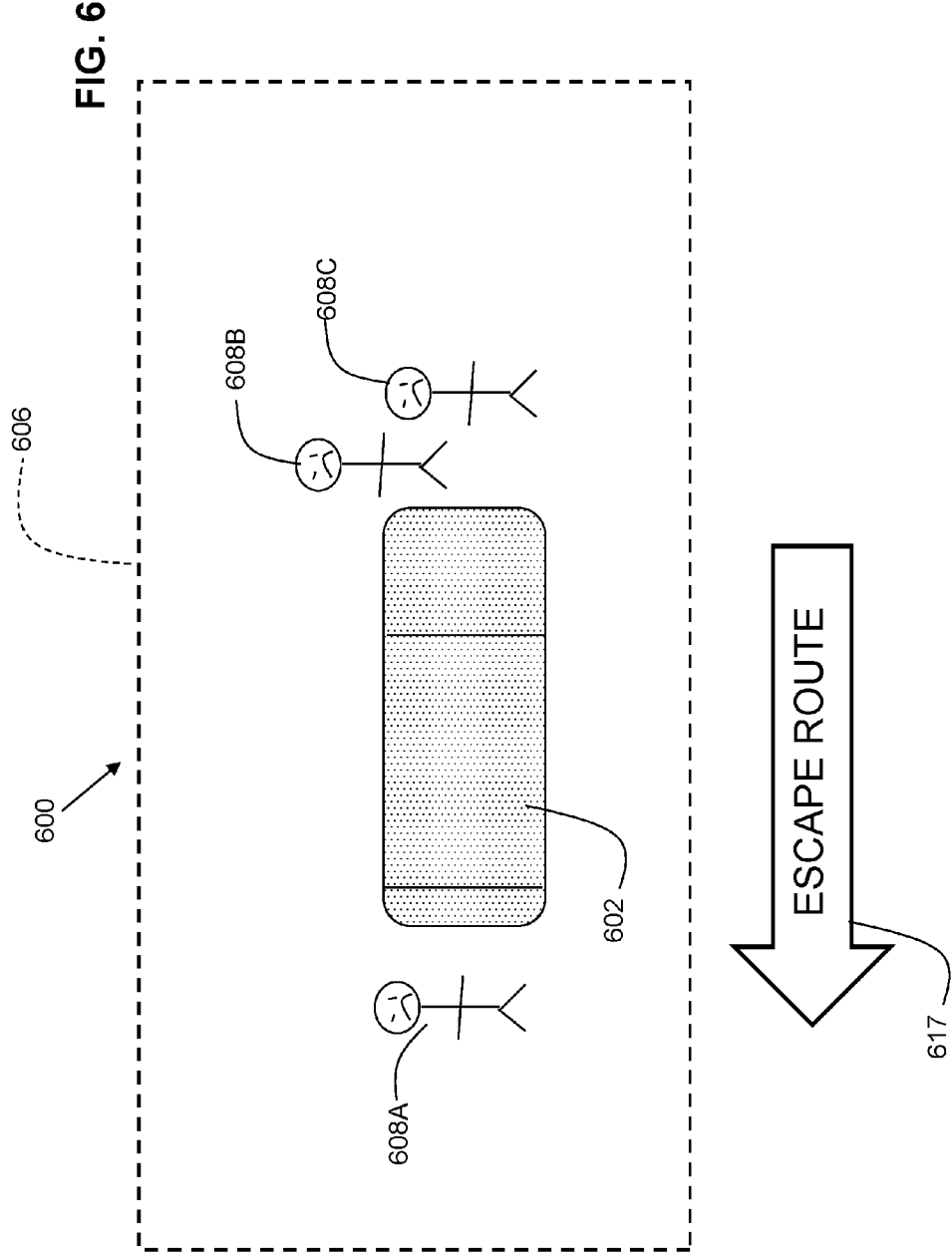

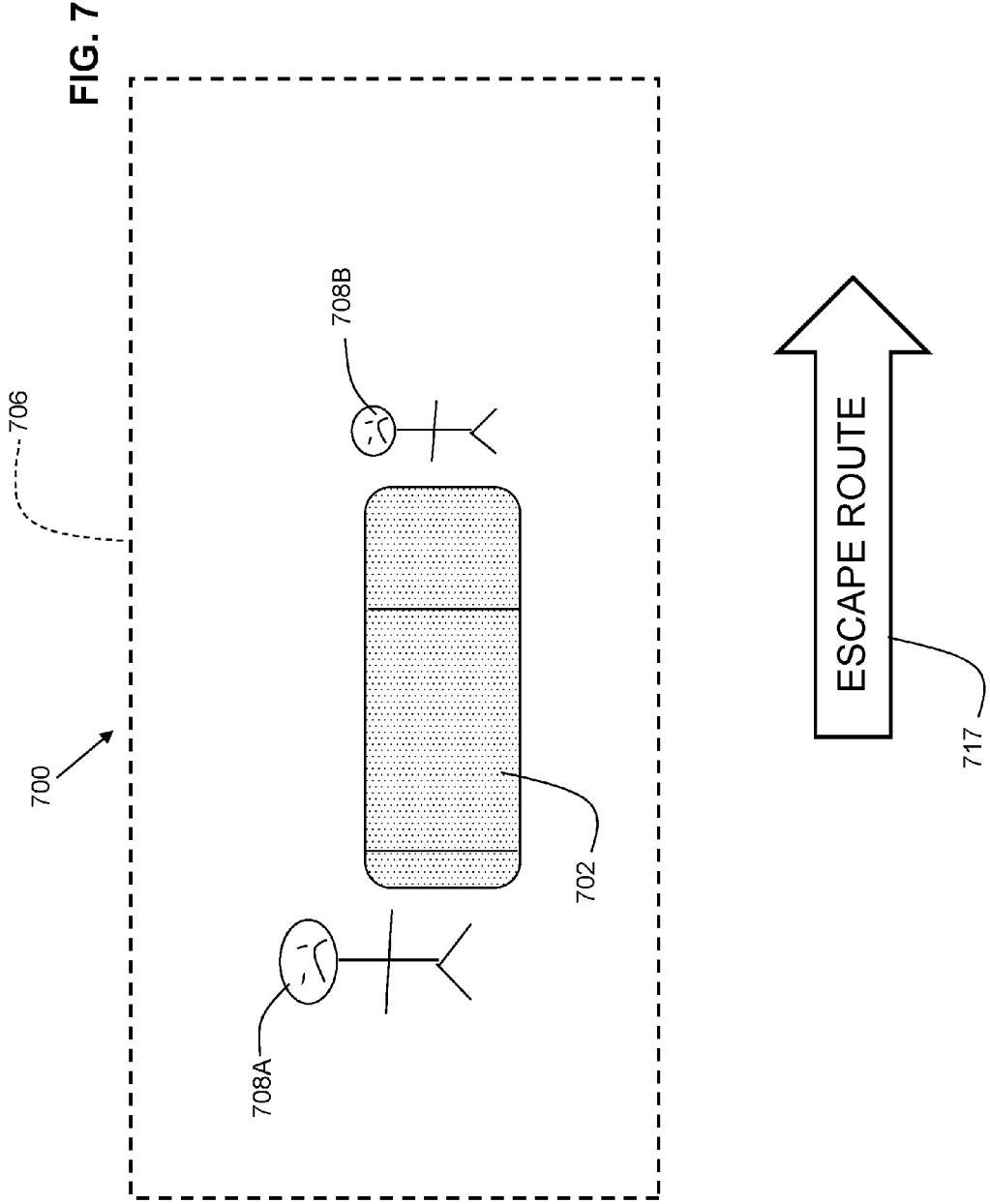

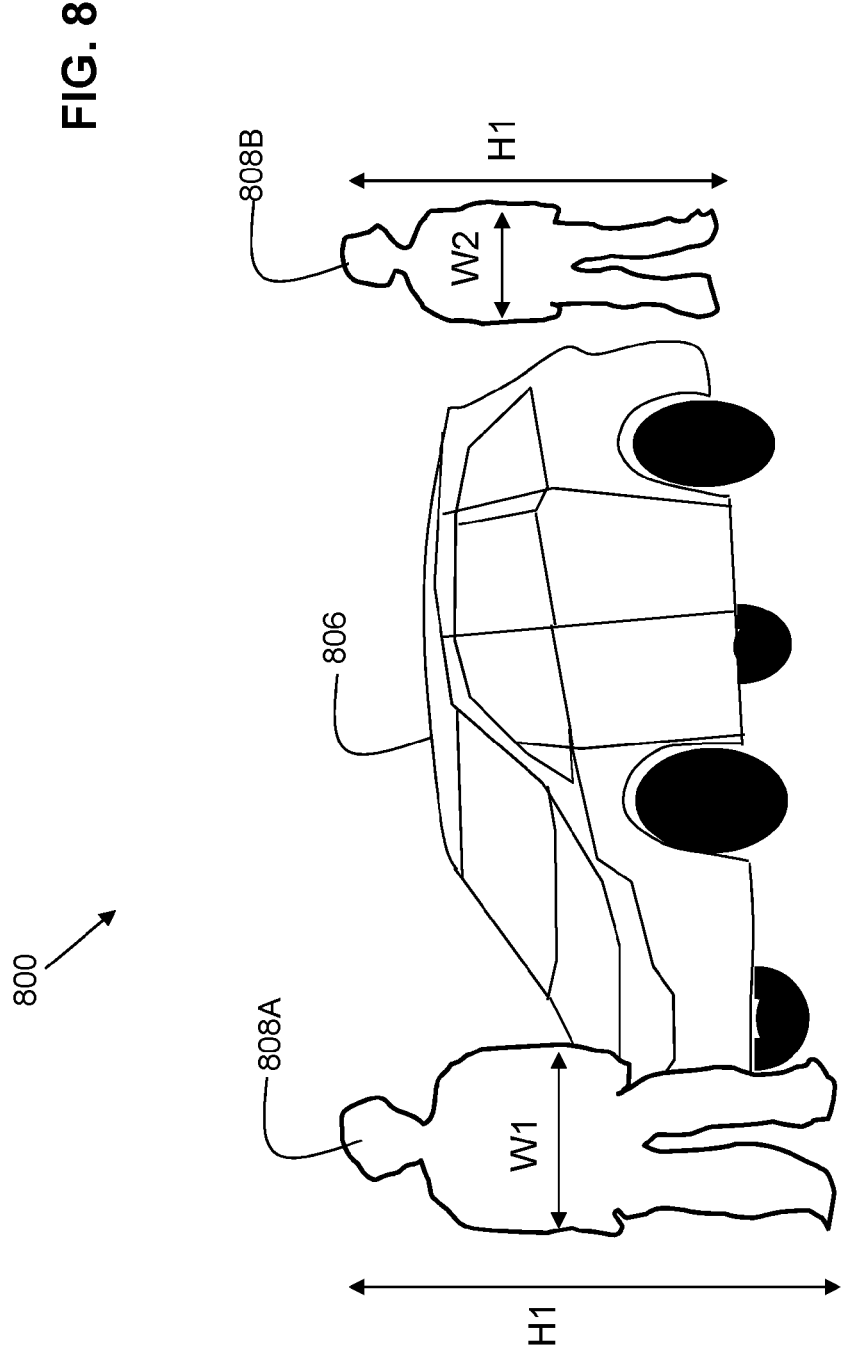

VEHICLE WITH AUTONOMOUS FEATURE OVERRIDE FOR THEFT PREVENTION

FIELD OF THE INVENTION

The present invention relates generally to vehicles, and more particularly, to vehicles with autonomous feature override.

BACKGROUND

Cars are rapidly becoming more autonomous. Features such as adaptive cruise control with lane keeping technology exist on currently available cars. Improvements in processing power and sensor technology, along with vehicle to vehicle communication and vehicle to infrastructure communication are paving the way for more vehicles with increased autonomy.

SUMMARY

One aspect provides a computer-implemented method for performing an emergency maneuver in a vehicle, comprising: receiving an emergency activation signal; determining a path of least resistance; deactivating a collision avoidance system; and directing the vehicle in the path of least resistance.

Another aspect includes sending an emergency escape warning message upon receiving the emergency activation signal.

Another aspect includes determining a path of least resistance by computing an impact target body mass estimate; and selecting a path that travels in a direction of a minimal target body mass.

Another aspect includes determining a path of least resistance comprises computing an impact target body distance estimate; and selecting a path that travels in a direction of a greatest minimum target body distance.

Another aspect includes disabling an airbag immobilization interlock upon receiving the emergency activation signal.

Another aspect includes initiating a video recording upon receiving the emergency activation signal.

Another aspect includes streaming the video recording to a third party upon receiving the emergency activation signal.

Another aspect includes activating an external audible alert upon receiving the emergency activation signal.

Another aspect includes activating an external visual alert upon receiving the emergency activation signal.

Another aspect provides a vehicle, comprising a drive train; a steering mechanism; an onboard computer configured to control the drive train, wherein the computer comprises: a processor; a memory coupled to the processor; wherein the memory contains instructions, that when executed by the processor, perform the steps of: receiving an emergency activation signal; determining a path of least resistance; deactivating a collision avoidance system; and directing the vehicle in the path of least resistance by controlling the drive train and the steering mechanism.

In another aspect, the memory further contains instructions, that when executed by the processor, perform the step of sending an emergency escape warning message upon receiving the emergency activation signal.

In another aspect, the memory further contains instructions, that when executed by the processor, perform the steps of: computing an impact target body mass estimate; and selecting a path that travels in a direction of a minimal target body mass.

In another aspect, the memory further contains instructions, that when executed by the processor, perform the steps of computing an impact target body distance estimate; and selecting a path that travels in a direction of a greatest minimum target body distance.

In another aspect, the memory further contains instructions, that when executed by the processor, perform the step of disabling an airbag immobilization interlock upon receiving the emergency activation signal.

In another aspect, the memory further contains instructions, that when executed by the processor, perform the step of initiating a video recording upon receiving the emergency activation signal.

In another aspect, the memory further contains instructions, that when executed by the processor, perform the step of streaming the video recording to a third party upon receiving the emergency activation signal.

In another aspect, the memory further contains instructions, that when executed by the processor, perform the step of activating an external audible alert upon receiving the emergency activation signal.

In another aspect, the memory further contains instructions, that when executed by the processor, perform the step of activating an external visual alert upon receiving the emergency activation signal.

Another aspect includes a vehicle, comprising a drive train, an onboard computer configured to control the drive train, wherein the computer comprises a processor, a memory coupled to the processor, wherein the memory contains instructions, that when executed by the processor, perform the steps of: receiving an emergency activation signal; sending an emergency escape warning message; and deactivating a collision avoidance system.

Another aspect includes a computer program product embodied in a computer-readable medium, comprising machine instructions, that when executed by a processor, cause the processor to: receive an emergency activation signal; determine a path of least resistance; deactivate a collision avoidance system; and direct the vehicle in the path of least resistance.

BRIEF DESCRIPTION OF THE DRAWINGS

FIG. 6 illustrates an exemplary emergency escape mode based on pedestrian number.

FIG. 7 illustrates an exemplary emergency escape mode based on pedestrian size.

FIG. 8 illustrates an exemplary emergency escape mode based on pedestrian height and width.

Figure 1:
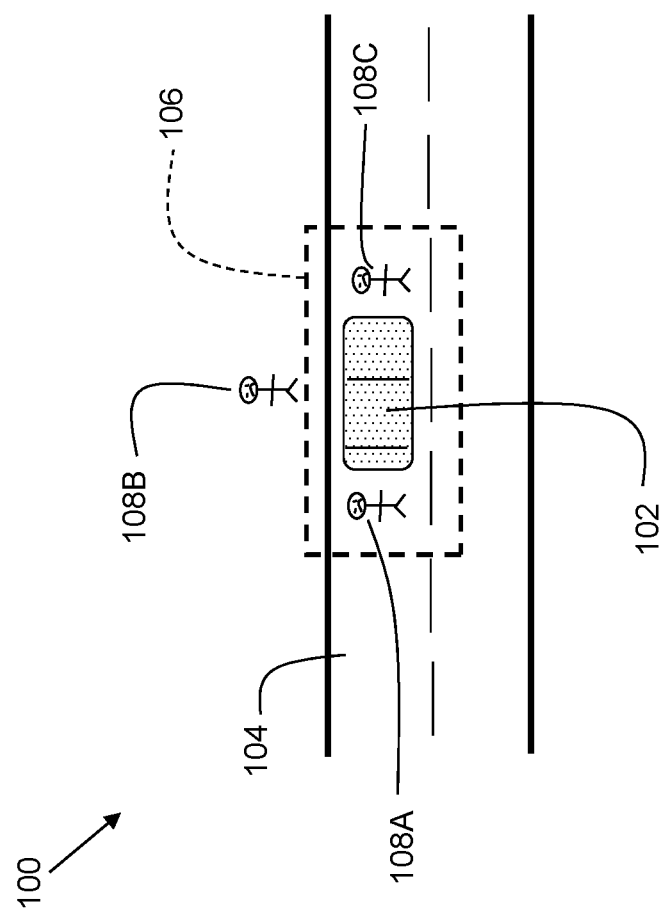
FIG. 1 shows a vehicle with autonomous features being carjacked.

The drawings are not necessarily to scale. The drawings are merely representations. The drawings are intended to depict only example embodiments of the current disclosure, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Vehicles with autonomous features are equipped with sensors and computers to facilitate full or partial autonomous driving. In some cases, conventional automobiles are outfitted with autonomous features such as automatic braking. For the purposes of this disclosure, vehicles with at least one autonomous feature including automatic braking based on pedestrian or other object detection are referred to as autonomous vehicles, even though they may not be fully autonomous. The autonomous vehicle (AV) is typically programmed to avoid collision, and in particular, pedestrian detection specifically is intended to prevent an AV from striking a pedestrian under any circumstances.

While in most cases, this mode of operation is highly desirable, the policies of AVs in the current state of the art create vulnerabilities in certain situations. For example, if an AV is programmed to avoid contact with a pedestrian under any circumstance, then it becomes possible for a team of criminals to immobilize an AV simply by having one person stand in front of the vehicle and another person stand behind the vehicle. That leaves the occupants of the AV vulnerable to theft and bodily harm from criminals. Thus a team of four or five people can immobilize the vehicle simply by surrounding it, with the occupants unable to flee because the AV is programmed to avoid pedestrian contact under any circumstance. Furthermore, a group of people wishing to cause malice could place a large, lightweight object such as a large cardboard box in front of an autonomous vehicle to stop it in its tracks, leaving its occupants vulnerable to crimes.

Embodiments of the present invention provide an autonomous vehicle with an emergency escape mode. When fleeing a scene is critical, embodiments provide an AV that can operate in an emergency escape mode (EEM) to enable the AV to flee a scene, protecting its occupants. Typically, a passenger or operator invokes EEM in an AV when they are in imminent danger from criminal activity such as carjacking. For the purposes of this disclosure, an autonomous vehicle (AV) includes a fully autonomous vehicle and/or a partially autonomous vehicle. For example, a vehicle that provides conventional driver control via steering wheel, brakes, and accelerator, but also provides automatic braking upon detection of pedestrians or other objects is also considered an autonomous vehicle for the purposes of this disclosure.

FIG. 1 shows an example 100 a vehicle with autonomous features being carjacked. In the example 100, an autonomous vehicle 102 is on a road 104. Multiple people, indicated as 108A, 108B, and 108C are robbing the occupants of vehicle 102. Person 108A stands at the rear of the vehicle 102. Person 108C stands at the front of the vehicle 102. Person 108A and person 108C are within the safety zone 106 of the vehicle. The safety zone 106 is a zone around the vehicle which triggers an automatic braking action upon detection of an object and/or pedestrian. This feature is referred to as a collision avoidance system. In some embodiments, the size of the safety zone 106 is dependent on the speed of the vehicle 102. A default size for safety zone 106 may be used when vehicle 102 is stationary. The autonomous safety systems of the vehicle prevent the vehicle from moving, leaving the vehicle 102 vulnerable for person 108B to rob the occupants of the vehicle.

Figure 2:
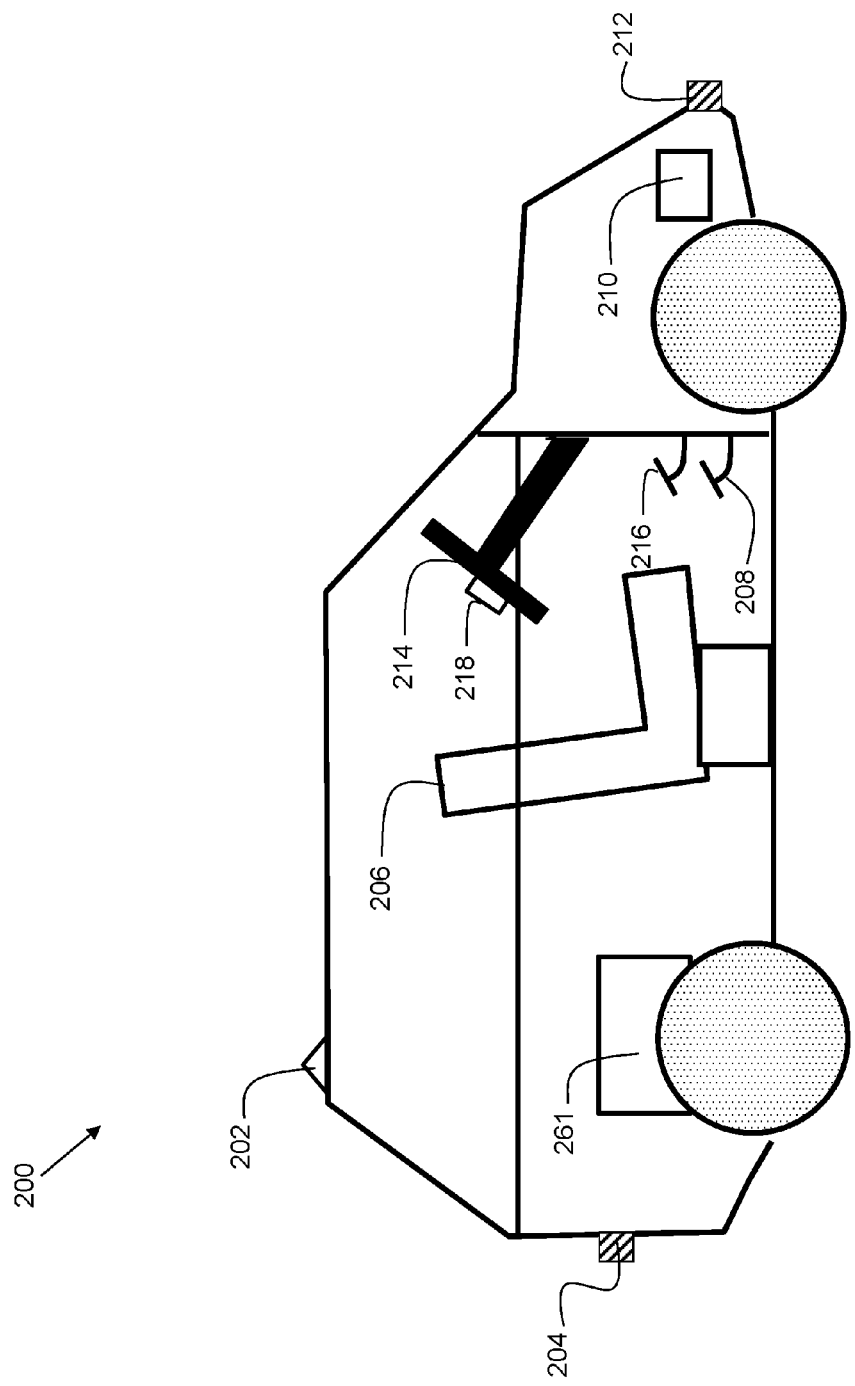
FIG. 2 shows a vehicle with autonomous features in accordance with embodiments of the present invention.

FIG. 2 shows a vehicle 200 with autonomous features in accordance with embodiments of the present invention. Vehicle 200 includes drive train 261 that may include a combustion engine and/or electric motor(s). Vehicle 200 may include a rear facing sensor system 204, and a front facing sensor system 212. The rear facing sensor system 204 and front facing sensor system 212 may include, but are not limited to, a camera, an infrared camera, lidar, radar, range determining equipment, and the like. The inputs from the rear facing sensor system 204 and front facing sensor system 212 are input to computer 210. In embodiments, the rear facing sensor system 204 and front facing sensor system 212 may be coupled to the computer 210 via a CAN bus, Ethernet network, serial connection such as RS-232, RS-485 or the like, and/or a wireless connection scheme.

Vehicle 200 is equipped with an accelerator pedal 208 and a brake pedal 216. Vehicle 200 is further equipped with antenna 202 which may be used for radio communication including AM, FM, and satellite radio reception, as well as cellular telephony and/or vehicle-to-vehicle (V2V) communication and/or vehicle-to-infrastructure (V2I) communication.

Vehicle seat 206 is configured and disposed to secure an occupant as a driver such that the occupant can operate pedals 208 and 216 with his feet. Additionally, steering wheel 214 allows control of the direction of the vehicle via the front, back, or all wheels of the vehicle. Emergency button 218 invokes an autonomous feature override for theft prevention. If a user encounters a scenario such as depicted in FIG. 1, the user can press button 218 to override the collision prevention features. Without such a capability, a user in a vehicle such as 102 of FIG. 1 is trapped just by the presence of the pedestrians 108A and 108C, as the safety systems of the vehicle prevent movement with a pedestrian blocking the escape paths of the vehicle. Under normal circumstances, it is highly desirable to prevent a vehicle from striking a pedestrian or other object, but hard coding this feature leaves vehicles with autonomous features vulnerable to theft and/or carjacking by the strategy outlined in FIG. 1. With embodiments of the present invention, in such an emergency, the user can invoke an emergency escape mode by pressing emergency escape button 218. Invoking emergency escape mode may include deactivating a collision avoidance system. While emergency escape button 218 is shown on the steering wheel 214, in practice, the emergency escape button 218 may be placed on the dashboard, vehicle floor, center console, or other location. In some embodiments, multiple presses of the button may be required to invoke the emergency escape mode to prevent a single accidental button press from unintentionally triggering emergency escape mode. Placing the vehicle in emergency escape mode may disable one or more safety systems, including an airbag immobilization interlock. Many modern vehicles automatically disable a vehicle if an airbag deploys. However, while in emergency escape mode, embodiments may allow a vehicle to perform an emergency maneuver and continue to operate even if one or more airbags within a vehicle deploy, allowing a user to safely flee a dangerous situation. Thus, embodiments include disabling an airbag immobilization interlock upon receiving an emergency activation signal.

In embodiments, in response to pressing the emergency escape button 218, the vehicle 200 may send a message via antenna 202 to an organization such as a local police department and/or a third party monitoring service. Video from rear facing sensor system 204 and front facing sensor system 212 may be recorded by storage on computer 210 as evidence of the attempted theft/carjacking. In this way, under the circumstance of attempted theft, a user can override pedestrian collision prevention features. However, automatic notification of authorities and/or recording and distribution of video of the situation from the vehicle reduces the likelihood that the override is used for purposes other than a legitimate need to escape for the purposes of safety. In some embodiments, the video may be live streamed to a website for archiving and/or real time viewing. Thus, embodiments include streaming the video recording to a third party upon receiving the emergency activation signal.

Figure 3:
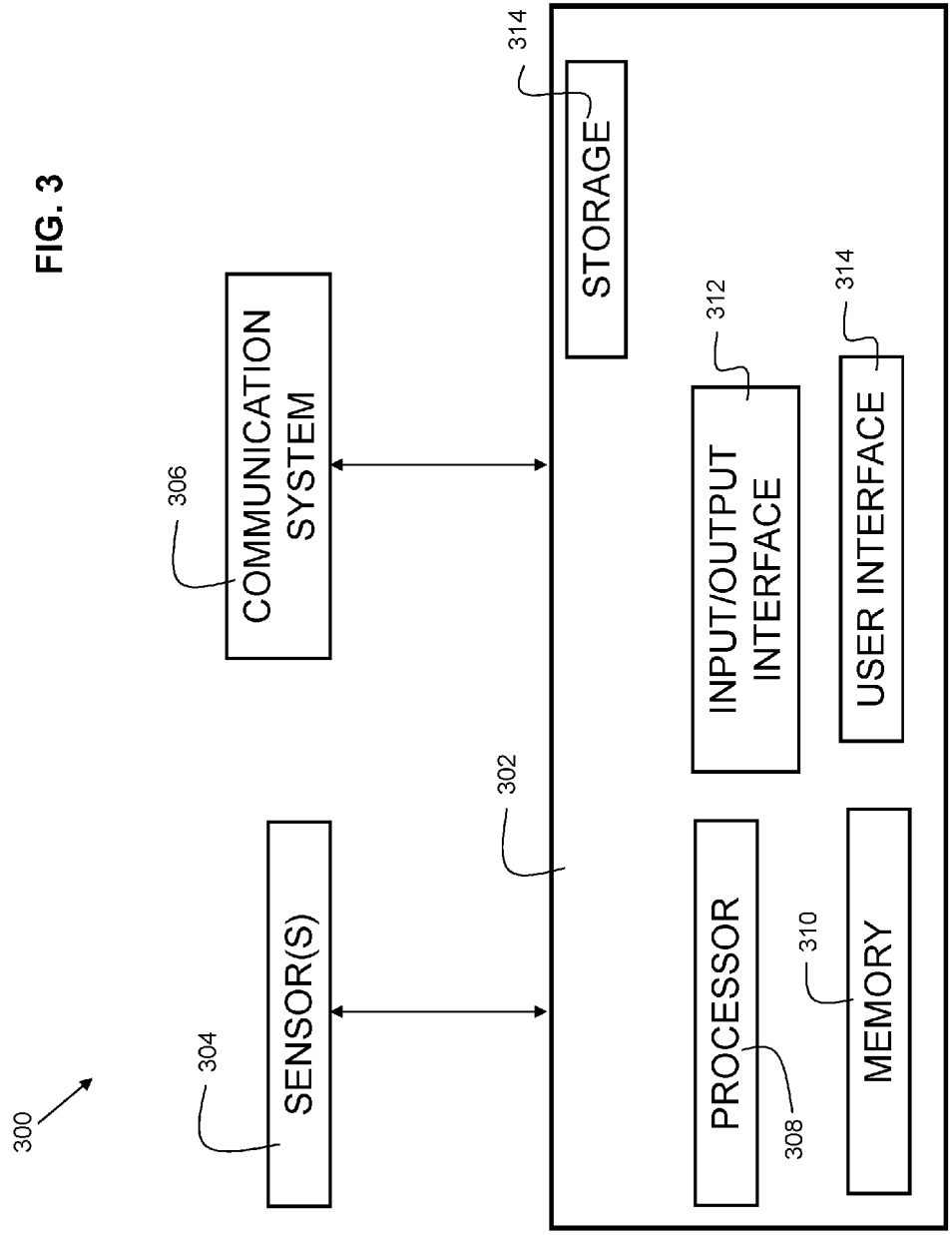
FIG. 3 is a block diagram of a system in accordance with embodiments of the present invention.

FIG. 3 is a block diagram of a system in accordance with embodiments of the present invention. System 300 includes a computer 302, which may be similar to computer 210 shown in FIG. 2. The computer 302 includes a processor 308, and memory 310 coupled to the processor 308. In embodiments, the memory 310 is non-transitory, and may include ROM, static RAM, flash, or the like. The memory 310 contains instructions, that when executed by processor 308, perform steps in accordance with embodiments of the present invention. The computer 302 may further include an input/output (I/O) interface 312, and a user interface 314. In embodiments, the user interface 314 may include the emergency escape button. The I/O interface 312 may interface with one or more sensors 304 from the rear facing sensor system 204, and front facing sensor system 212. The computer 302 may further interface with a communication system 306 for transmitting a message indicating that an emergency escape has been triggered. Storage 314 may include magnetic storage such as a hard disk drive, and/or a solid state disk drive (SSD), or other suitable memory for storing video. In embodiments, once the emergency escape is triggered, video and/or other sensor data is stored to storage 314 for later examination during investigation of the incident.

Figure 4:
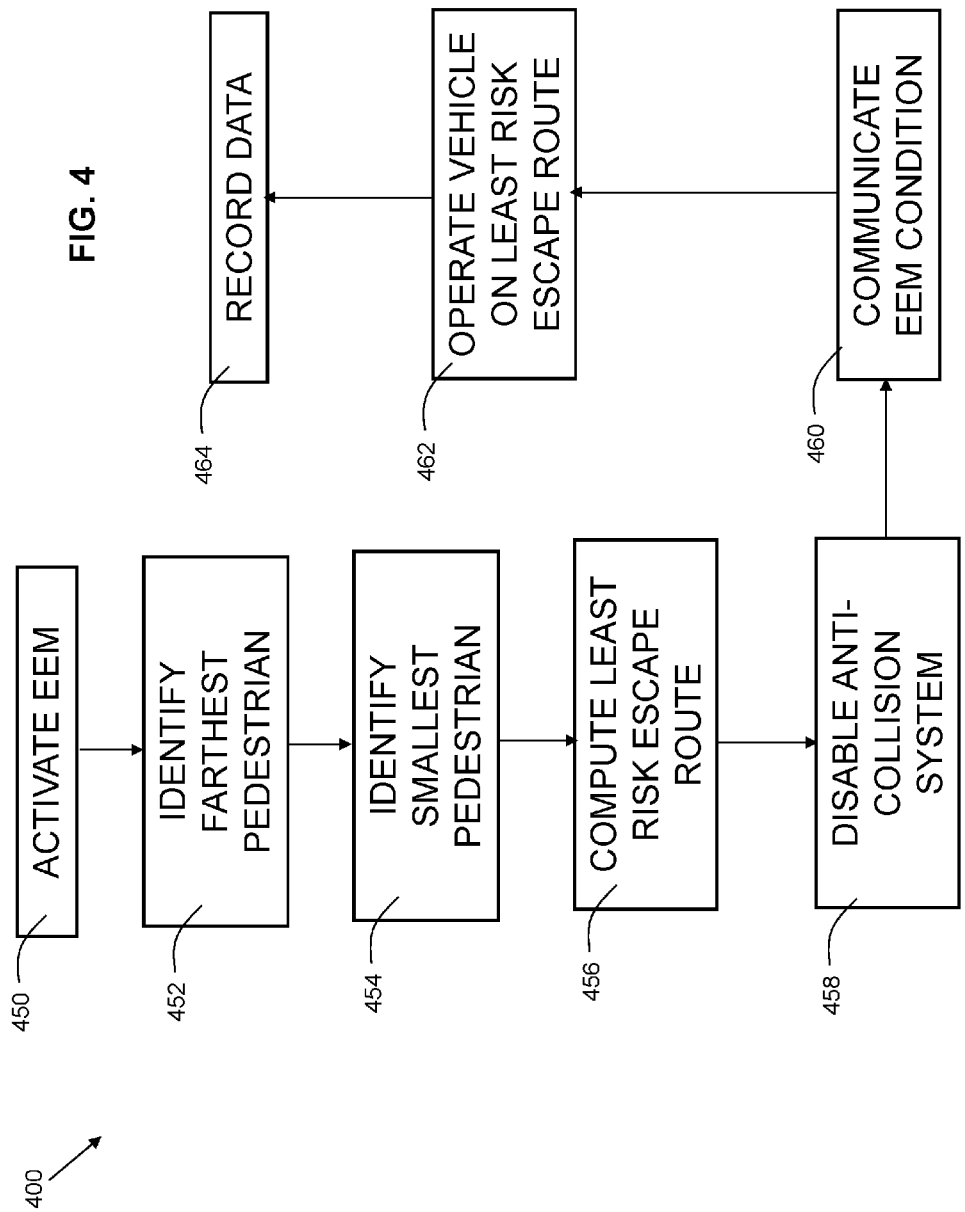
FIG. 4 is a flowchart indicating process steps for embodiments of the present invention.

FIG. 4 is a flowchart 400 indicating process steps for embodiments of the present invention. This embodiment may be used in a fully autonomous vehicle. At process step 450, an emergency escape mode is triggered by a user. The user may trigger the emergency escape mode by a button press, voice command, gesture, a combination of those, or other suitable mechanism. At process step 452, the farthest pedestrian within the safety zone is identified. At process step 454 a smallest pedestrian within the safety zone is identified. At process step 456, a least-risk escape route is computed. The least-risk escape route may include selecting a route that heads towards the person farthest away but still within the safety zone, which gives more time for that person to get out of the way of the vehicle. The least-risk escape route may include selecting a route that heads towards the smallest person within the safety zone, which results in less damage to the vehicle and increases the probability of a successful escape. At process step 458, the anti-collision system is disabled, allowing the vehicle to escape the dangerous situation. At process step 460, the emergency escape mode condition is communicated. In embodiments, the emergency escape mode may be communicated by an automated text and/or voice call to 911 or other police agency. Thus, embodiments can include sending an emergency escape warning message upon receiving an emergency activation signal. At process step 462, the vehicle is operated on the route determined at 456. At process step 464, the data (e.g. camera data and other sensor data) from the vehicle is recorded. Thus, embodiments include initiating a video recording upon receiving the emergency activation signal. In some embodiments, the vehicle may issue a warning to the surrounding pedestrians upon activation of emergency escape mode. The warning may be in the form of blinking the headlights and taillights of the vehicle and/or honking the horn. Thus embodiments include activating an external audible alert upon receiving the emergency activation signal. Embodiments may include activating an external visual alert upon receiving the emergency activation signal. Note that while the flowchart 400 shows steps in a sequential manner, in embodiments, one or more of these steps may be performed simultaneously, or performed in a different order. For example, process steps 452 and 454 may be performed simultaneously. Process step 464 can be performed before process step 452, and so on.

Figure 5:
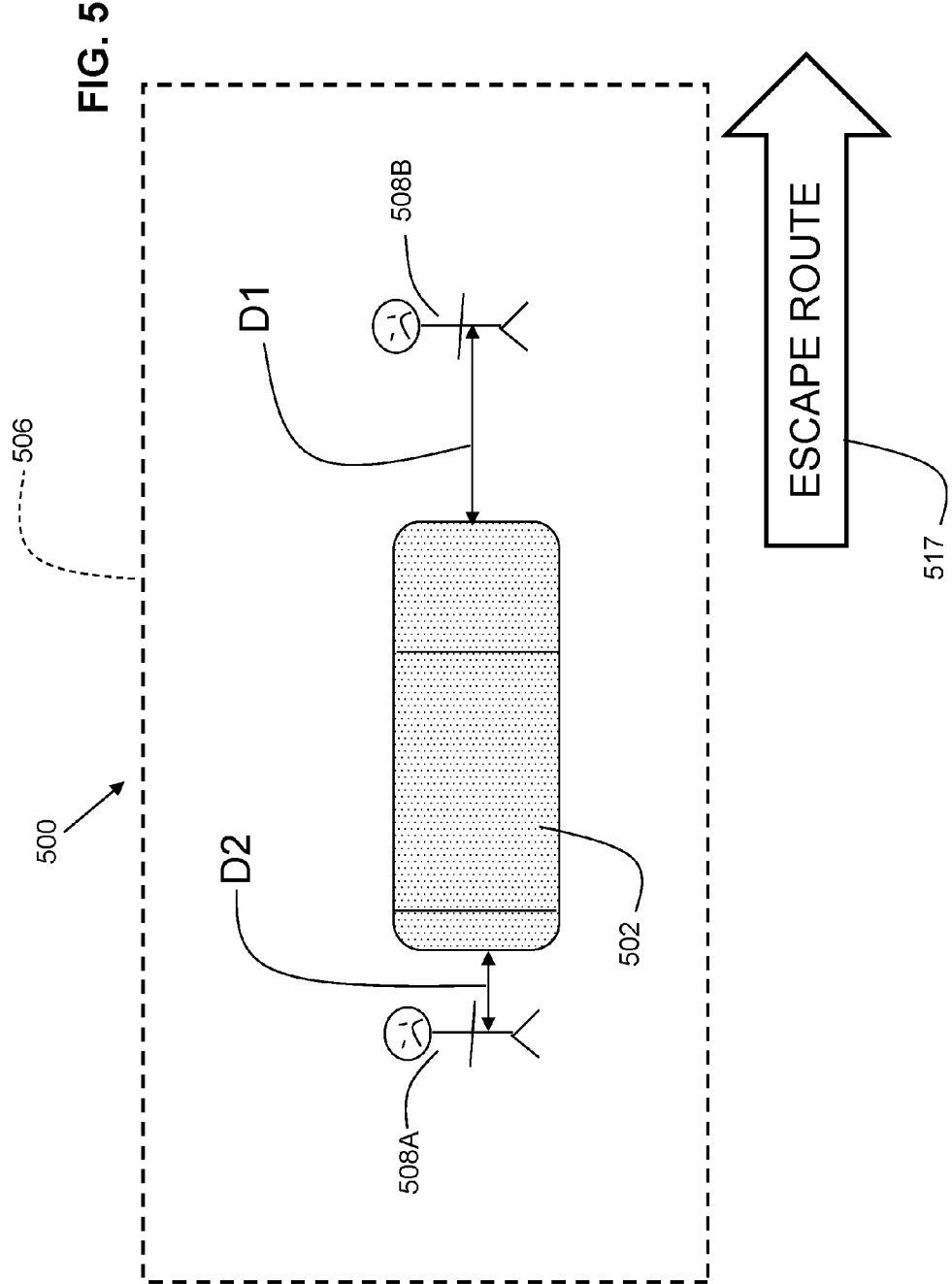
FIG. 5 illustrates an exemplary emergency escape mode based on pedestrian distance.

FIG. 5 illustrates an exemplary emergency escape mode based on pedestrian distance. In the example 500, pedestrian 508A is at a distance D2 from vehicle 502 and pedestrian 508B is at distance D1 from vehicle 502, where D1>D2. Both pedestrians are standing within vehicle safety zone 506. In embodiments, the escape route is selected based on the direction having the farthest pedestrian distance. In this case, pedestrian 508B is farther away from vehicle 502 than pedestrian 508A, thus the escape route is selected as the direction indicated by arrow 517. Thus, embodiments include determining a path of least resistance by computing an impact target body distance estimate, and selecting a path that travels in a direction of a greatest minimum target body distance. The impact target body distance estimate is the estimated distance between the vehicle 502 and a pedestrian that would be struck on a given escape route. The greatest minimum target body distance is the greatest minimum distance from the vehicle amongst the pedestrians within the safety zone on a given escape route. Thus, in the example 500, the greatest minimum distance is D1.

FIG. 6 illustrates an exemplary emergency escape mode based on pedestrian number. In the example 600, there is one pedestrian 608A at the rear of the car, and two pedestrians 608B and 608C at the front of the car. All three pedestrians are standing within vehicle safety zone 606. In general, the variable B represents the number of pedestrians at the rear of the car, and the variable F represents the number of pedestrians at the front of the car. Thus, in embodiments, the following algorithm may be used:

if (B>F)
   escape_route (reverse)
else
   escape_route (forward)

In the example 600, B>F, and so the escape route of vehicle 602 is selected as the direction indicated by arrow 617.

FIG. 7 illustrates an exemplary emergency escape mode based on pedestrian size. Both pedestrians are standing within vehicle safety zone 706. In the example 700, the pedestrian 708A is considerably larger than pedestrian 708B, and hence, the escape route is selected as the direction indicated by arrow 717. In this way, the escape route of vehicle 702 is directed towards the smaller pedestrian, reducing the risk of vehicle damage and thus increasing the probability of a successful escape.

FIG. 8 illustrates an exemplary emergency escape mode based on pedestrian height and width. In the example 800, pedestrian 808A is standing in front of vehicle 802 and pedestrian 808B is standing behind vehicle 802. Pedestrian 808A has a detected height H1 and a detected width W1. Pedestrian 808B has a detected height H2 and a detected width W2. In embodiments, the height and width of each pedestrian detected by vehicle 802 is approximated by the rear facing sensor system 204, and front facing sensor system 212. In embodiments, the units may be centimeters, inches, or other units. In embodiments, the height and width of each pedestrian is multiplied together to derive a size score, which is representative of a target body mass. For example, if W1 is 41 inches and H1 is 74 inches, then the size score for pedestrian 808A is 3034. Furthermore, if W2 is 36 inches and H1 is 76 inches, then the size score for pedestrian 808B is 2736. Thus, the preferred escape route is in the direction of pedestrian 808B because that pedestrian has a smaller size score than pedestrian 808A, even though pedestrian 808B is detected as being taller than pedestrian 808A. Thus, embodiments include determining a path of least resistance by computing an impact target body mass estimate, and selecting a path that travels in a direction of a minimal target body mass. The impact target body mass estimate is an estimate of the body mass of a pedestrian that would be struck during an escape on a given escape route. The minimal target body mass is the lowest mass of a pedestrian amongst the pedestrians that are within the safety zone 806.

The examples shown in FIGS. 5-8 illustrate various scenarios of computing a path of least resistance. The path of least resistance is a path deemed to cause the least bodily harm to pedestrians and/or maximize the probability of a successful escape. Embodiments may include a vehicle, comprising a drive train, a steering mechanism, an onboard computer configured to control the drive train, wherein the computer comprises, a processor, a memory coupled to the processor, wherein the memory contains instructions, that when executed by the processor, perform the steps of, receiving an emergency activation signal, determining a path of least resistance, deactivating a collision avoidance system, and directing the vehicle in the path of least resistance by controlling the drive train and the steering mechanism.

As can now be appreciated, disclosed embodiments greatly improve occupant safety in vehicles with autonomous features by reducing the risk of being trapped by pedestrians as part of an attempted robbery and/or carjacking. While under normal circumstances, striking a pedestrian with a vehicle should be prevented at all costs, under the circumstance of bad actors intending malice to vehicle occupants, there needs to be an effective technique for initiating an escape.

The detailed description herein is presented largely in terms of processes and symbolic representations of operations performed by conventional computers. A computer may be any microprocessor or processor (hereinafter referred to as processor) controlled device, including terminal devices, such as personal computers, workstations, servers, clients, mini-computers, main-frame computers, laptop computers, a network of one or more computers, mobile computers, portable computers, or any combination thereof.

The computer may possess input devices such as, by way of example, a keyboard, a keypad, a mouse, a microphone, or a touch screen, and output devices such as a computer screen, display, printer, or a speaker. Additionally, the computer includes memory such as a memory storage device or an addressable storage medium.

The computer memory may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the techniques used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be understood, however, that these and some other terms should be associated with appropriate physical quantities for computer operations and that these terms are merely conventional labels applied to physical quantities that exist within and during operation of the computer.

It should be understood that manipulations within the computer are often referred to in terms of adding, comparing, moving, searching, and the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM) or programs stored on machine-readable medium, such as a floppy disk, a CD, a DVD, or other recordable medium or memory device for storing the software. The machine-readable medium is operable by a computer or other device suitable to execute the software stored by the machine-readable medium.

Embodiments described above illustrate but do not limit the scope of this disclosure. It should also be understood that numerous modifications and variations are possible in accordance with the principles of the present disclosure. Accordingly, the scope of the disclosure is defined by the following claims.

What is claimed is:

1. A computer-implemented method for performing an emergency maneuver in a vehicle, comprising:
   receiving an emergency activation signal;
   determining a path of least resistance;
   deactivating a collision avoidance system; and
   directing the vehicle in the path of least resistance.

2. The method of claim 1, further comprising sending an emergency escape warning message upon receiving the emergency activation signal.

3. The method of claim 2, further comprising initiating a video recording upon receiving the emergency activation signal.

4. The method of claim 3, further comprising streaming the video recording to a third party upon receiving the emergency activation signal.

5. The method of claim 1, wherein determining a path of least resistance comprises:
   computing an impact target body mass estimate; and
   selecting a path that travels in a direction of a minimal target body mass.

6. The method of claim 1, wherein determining a path of least resistance comprises:
   computing an impact target body distance estimate; and
   selecting a path that travels in a direction of a greatest target body distance.

7. The method of claim 1, further comprising disabling an airbag immobilization interlock upon receiving the emergency activation signal.

8. The method of claim 1, further comprising activating an external audible alert upon receiving the emergency activation signal.

9. The method of claim 1, further comprising activating an external visual alert upon receiving the emergency activation signal.

10. A vehicle, comprising:
    a drive train;
    a steering mechanism;
    an onboard computer configured to control the drive train and steering mechanism, wherein the computer comprises:
      a processor;
      a memory coupled to the processor;
      wherein the memory contains instructions, that when executed by the processor, perform the steps of:
      receiving an emergency activation signal;
      determining a path of least resistance;
      deactivating a collision avoidance system; and
      directing the vehicle in the path of least resistance by controlling the drive train and the steering mechanism.

11. The vehicle of claim 10, further comprising a communication system, and wherein the memory further contains instructions, that when executed by the processor, perform the step of sending an emergency escape warning message via the communication system, upon receiving the emergency activation signal.

12. The vehicle of claim 10, wherein the memory further contains instructions, that when executed by the processor, perform the steps of:
    computing a height and width of a pedestrian located within a safety zone of the vehicle;
    computing a size score based on the height and width;
    computing an impact target body mass estimate based on the size score; and
    selecting a path that travels in a direction of a minimal target body mass.

13. The vehicle of claim 10, further comprising an airbag immobilization interlock, and wherein the memory further contains instructions, that when executed by the processor, perform the step of disabling the airbag immobilization interlock upon receiving the emergency activation signal.

14. The vehicle of claim 10, further comprising a video recording device, and wherein the memory further contains instructions, that when executed by the processor, perform the step of initiating a video recording from the video recording device upon receiving the emergency activation signal.

15. The vehicle of claim 14, further comprising a communication system, and wherein the memory further contains instructions, that when executed by the processor, perform the step of streaming the video recording to a third party via the communication system, upon receiving the emergency activation signal.

16. The vehicle of claim 10, further comprising a horn, and wherein the memory further contains instructions, that when executed by the processor, perform the step of activating an external audible alert from the horn upon receiving the emergency activation signal.

17. The vehicle of claim 10, further comprising a plurality of headlights and taillights, and wherein the memory further contains instructions, that when executed by the processor, perform the step of activating an external visual alert from the plurality of headlights and taillights upon receiving the emergency activation signal.

18. A vehicle, comprising:
    a drive train;
    an onboard computer configured to control the drive train, wherein the computer comprises:
      a processor;
      a communication system;
      a memory coupled to the processor;
      wherein the memory contains instructions, that when executed by the processor, perform the steps of:
      receiving an emergency activation signal;
      sending an emergency escape warning message via the communication system; and
      deactivating a collision avoidance system.

* * * * *